United States Patent
Cohen et al.

(10) Patent No.: US 10,402,777 B2
(45) Date of Patent: Sep. 3, 2019

(54) METHOD AND A SYSTEM FOR OBJECT RECOGNITION

(71) Applicant: TRAX TECHNOLOGY SOLUTIONS PTE. LTD., Singapore (SG)

(72) Inventors: Daniel Shimon Cohen, Ra'anana (IL); Yair Adato, Tomer (IL); Dolev Pomeranz, Kfar Saba (IL)

(73) Assignee: TRAX TECHNOLOGY SOLUTIONS PTE LTD., Singapore (SG)

( * ) Notice: Subject to any disclaimer, the term of this patent is extended or adjusted under 35 U.S.C. 154(b) by 156 days.

(21) Appl. No.: 15/616,474

(22) Filed: Jun. 7, 2017

(65) Prior Publication Data
US 2017/0270475 A1 Sep. 21, 2017

Related U.S. Application Data

(63) Continuation-in-part of application No. 15/316,657, filed as application No. PCT/IL2015/050576 on Jun. 7, 2015, now abandoned.

(30) Foreign Application Priority Data

Jun. 18, 2014 (IL) .......................................... 233208

(51) Int. Cl.
G06Q 10/08 (2012.01)
H04N 5/247 (2006.01)
G06K 9/32 (2006.01)

(52) U.S. Cl.
CPC ......... G06Q 10/087 (2013.01); G06K 9/3241 (2013.01); H04N 5/247 (2013.01); G06K 2209/17 (2013.01)

(58) Field of Classification Search
CPC ............... G06Q 10/087; G06K 9/3241; G06K 2209/17; H04N 5/247
See application file for complete search history.

(56) References Cited

U.S. PATENT DOCUMENTS 6,195,122 B1 2/2001 Vincent
6,618,511 B1 9/2003 Mancuso et al.
(Continued)

FOREIGN PATENT DOCUMENTS

FR 2851833 9/2004
JP 2002/295959 10/2002
(Continued)

OTHER PUBLICATIONS

Supplementary European Search Report for EP Application No. 15809764.2, dated Jan. 19, 2018 (8 pages).
(Continued)

Primary Examiner — Utpal D Shah
(74) Attorney, Agent, or Firm — Finnegan, Henderson, Farabow, Garrett & Dunner, L.L.P.

(57) ABSTRACT

The present disclosure provides a method of image processing comprising: obtaining by an imaging device a low resolution version and a high resolution version of a retail image, the high resolution version of the retail image being a temporary file to be erased automatically after a predetermined time period; transmitting to a server the low resolution version of the retail image; upon receipt of a request from the server, the request including data representative of a contour of an unidentified item in the low resolution version of the retail image, cropping a high resolution item image from the high resolution version of the retail image, the high resolution item image corresponding to the contour of the unidentified item; and transmitting the high resolution item image to the server thereby enabling updating an item database.

24 Claims, 3 Drawing Sheets

(56) References Cited

U.S. PATENT DOCUMENTS

| | | | |
|---|---|---|---|
| 7,031,948 B2 | 4/2006 | Lee | |
| 7,103,236 B2 | 9/2006 | Peterson | |
| 7,120,593 B1* | 10/2006 | Fry | G06Q 30/06 |
| | | | 705/27.1 |
| 7,210,136 B2 | 4/2007 | Swett | |
| 7,287,731 B2 | 10/2007 | Johnson | |
| 7,620,909 B2 | 11/2009 | Park et al. | |
| 7,903,883 B2 | 3/2011 | Zitnick et al. | |
| 8,131,086 B2 | 3/2012 | Hua et al. | |
| 8,515,207 B2 | 8/2013 | Chau | |
| 8,559,766 B2 | 10/2013 | Tilt et al. | |
| 9,160,899 B1 | 10/2015 | Boyle et al. | |
| 10,007,964 B1* | 6/2018 | Calhoon | G06T 1/0021 |
| 2002/0067500 A1* | 6/2002 | Yokomizo | G06T 11/60 |
| | | | 358/1.15 |
| 2005/0050052 A1* | 3/2005 | Zimmerman | G06F 9/451 |
| 2005/0256391 A1 | 11/2005 | Satoh et al. | |
| 2006/0240862 A1* | 10/2006 | Neven | G06K 9/228 |
| | | | 455/550.1 |
| 2007/0025723 A1 | 2/2007 | Baudisch et al. | |
| 2007/0031062 A1 | 2/2007 | Pal et al. | |
| 2007/0070233 A1 | 3/2007 | Patterson | |
| 2007/0081081 A1 | 4/2007 | Cheng | |
| 2008/0074489 A1 | 3/2008 | Zhang et al. | |
| 2008/0247667 A1 | 10/2008 | Jin et al. | |
| 2009/0003708 A1 | 1/2009 | Steinberg et al. | |
| 2009/0185784 A1 | 7/2009 | Hiroike et al. | |
| 2009/0192921 A1 | 7/2009 | Hicks | |
| 2010/0035637 A1 | 2/2010 | Varanasi et al. | |
| 2010/0097443 A1 | 4/2010 | Lablans | |
| 2010/0171826 A1 | 7/2010 | Hamilton et al. | |
| 2010/0217678 A1 | 8/2010 | Goncalves | |
| 2010/0222099 A1 | 9/2010 | Fields | |
| 2010/0321470 A1 | 12/2010 | Oshima | |
| 2011/0007154 A1 | 1/2011 | Vogel et al. | |
| 2011/0058715 A1 | 3/2011 | Doering et al. | |
| 2011/0079083 A1 | 4/2011 | Yoo et al. | |
| 2011/0115917 A1* | 5/2011 | Lee | G06K 9/00221 |
| | | | 348/159 |
| 2011/0128150 A1* | 6/2011 | Kanga | G08B 13/19669 |
| | | | 340/541 |
| 2011/0173082 A1 | 7/2011 | Breitenbach et al. | |
| 2011/0173100 A1 | 7/2011 | Boncyk et al. | |
| 2012/0027390 A1 | 2/2012 | Ueyama | |
| 2012/0051652 A1 | 3/2012 | Lee et al. | |
| 2012/0075411 A1 | 3/2012 | Matsumoto et al. | |
| 2012/0243739 A1 | 9/2012 | Fukunchi et al. | |
| 2012/0293607 A1 | 11/2012 | Bhogal et al. | |
| 2012/0300019 A1 | 11/2012 | Yang et al. | |
| 2014/0009382 A1* | 1/2014 | Chou | G06F 3/017 |
| | | | 345/156 |
| 2014/0052555 A1 | 2/2014 | MacIntosh | |
| 2015/0071606 A1* | 3/2015 | Wintzell | G09G 5/005 |
| | | | 386/241 |
| 2015/0139535 A1 | 5/2015 | Siddiqui | |
| 2015/0141759 A1 | 5/2015 | Charles et al. | |
| 2015/0187101 A1 | 7/2015 | Maayan et al. | |
| 2015/0193909 A1 | 7/2015 | Maayan et al. | |
| 2016/0143459 A1 | 5/2016 | Clein | |
| 2017/0032311 A1* | 2/2017 | Rizzolo | G06Q 20/201 |
| 2017/0261993 A1* | 9/2017 | Venable | G06Q 10/087 |

FOREIGN PATENT DOCUMENTS

| | | |
|---|---|---|
| JP | 2003/004366 | 1/2003 |
| JP | 2007/046833 | 2/2007 |
| WO | WO-2012/155121 | 9/2004 |
| WO | WO-2008/107150 | 9/2008 |
| WO | WO-2009/027835 | 3/2009 |
| WO | WO-2014/181323 | 11/2014 |
| WO | WO-2015/083170 | 6/2015 |
| WO | WO-2015/114621 | 8/2015 |
| WO | WO-2015/193877 | 12/2015 |

OTHER PUBLICATIONS

Changchang Wu et al.; "3D Model Matching With Viewpoint-Invariant Patches (VIP)", Computer Vision and Pattern Recognition, CVPR 2008, IEEE Conference, pp. 1-8 (2008).

International Search Report and Written Opinion from the Israel Patent Office for International Application No. PCT/IL2014/050378, dated Aug. 7, 2014.

International Search Report and Written Opinion from the Israel Patent Office for International Application No. PCT/IL2014/051061, dated Mar. 26, 2015.

International Search Report and Written Opinion from the Israel Patent Office for International Application No. PCT/IL2014/051127, dated May 15, 2015.

International Search Report and Written Opinion from the Israel Patent Office for International Application No. PCT/IL2015/050070, dated Apr. 28, 2015.

International Search Report from the Israel Patent Office for International Application No. PCT/IL2015/050576, dated Oct. 14, 2015.

International Search Report from the Israel Patent Office for International Application No. PCT/IL2014/050377, dated Jul. 25, 2014.

* cited by examiner

METHOD AND A SYSTEM FOR OBJECT RECOGNITION

CROSS REFERENCE TO RELATED APPLICATIONS

This application is a continuation-in-part of and claims priority from U.S. patent application Ser. No. 15/316,657, filed Dec. 6, 2016 (pending), which is a national phase application based on PCT/IL2015/050576, filed Jun. 7, 2015, which claims the priority of Israeli Patent Application No. 233208, filed Jun. 18, 2014, the contents of all of which are incorporated herein by reference.

TECHNOLOGICAL FIELD

The present disclosure relates generally to the field of image processing. More particularly, the present disclosure relates to a method and system of image processing useful for improving object recognition in a retail environment.

BACKGROUND

Object recognition relates to the task of identifying objects in an image or video sequence with a computer system. Object recognition in a retail environment presents specific challenges. Particularly, objects in a retail environment have high variability because products' appearance attributes (e.g. size, color, amount of products in a package) are often modified by manufacturers in order to fit various requirements, such as special discounts for holidays, or for targeted customers. Furthermore, new products are regularly introduced in the market.

This increases difficulty for current object recognition systems.

SUMMARY

Consistent with disclosed embodiments, an image processing system for analyzing retail items displayed on store shelves is provided. The system may include a database configured to store a set of visual identifiers corresponding to a plurality of retail items and at least one server. The at least one server may receive from a first remote imaging device at least one image of a plurality of products displayed on a store shelf and attempt to recognize at least one of the plurality of products to a degree of certainty by searching for a visual identifier in the at least one image. The at least one server may also send to a second remote imaging device a request about the at least one product, when the attempt at least partially fails. Thereafter, the at least one server may receive from the second remote imaging device a response, and identify the at least one product based on the at least one image and the received response.

Consistent with other disclosed embodiments, a non-transitory computer readable medium for image processing is provided. The computer readable medium including instructions that, when executed by at least one processor, cause the at least one processor to perform operations comprising: receiving from a remote imaging device at least one image of a plurality of products displayed on a store shelf; attempting to recognize at least one of the plurality of products to a degree of certainty by searching for a visual identifier in the at least one image; sending to the remote imaging device a request about the at least one product, when the attempt at least partially fails; receiving from the remote imaging device a response; and identifying the at least one product based on the at least one image and the received response.

Consistent with other disclosed embodiments, an imaging device for analyzing retail items displayed on store shelves is provided. The imaging device may include a memory, an image sensor; and at least one processor communicatively coupled to the memory and image sensor. The memory may include instructions for causing the at least one processor to perform the following steps of: obtaining at least one image of a plurality of products displayed on a store shelf; transmitting to a server the at least one image; upon receipt of a request about at least one product that the server failed to recognize, obtaining an additional image of the at least one product; and transmitting the additional image of the at least one product to the server to facilitate identifying the plurality of products displayed on a store shelf.

The foregoing general description and the following detailed description are exemplary and explanatory only and are not restrictive of the claims.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

GENERAL DESCRIPTION

In the present application, the following terms and their derivatives may be understood in light of the below explanations:

Imaging Device

An imaging device may be an apparatus capable of acquiring pictures of a scene. The term "imaging device" includes any device capably of recording optical signals entering a lens onto a recording medium as a still picture or sequence of images. The optical signals may be in the near-infrared, infrared, visible, ultraviolet, or other non-human-visible spectrums. In one embodiment, the imaging device may comprise an image sensor, memory, a display communicatively coupled to the memory and a processing unit communicatively coupled to the memory, display and image sensor wherein the memory includes instructions for causing the processing unit to perform an image processing method. It should be understood that the term imaging device encompasses different types of cameras such as standard digital cameras, fixed security cameras with communication layers, electronic handheld devices (e.g., smartphones and tablets), an autonomous robotic device, a drone with one or more imaging sensors, etc. Furthermore, in the following, it is understood that the images processed may be "retail images," e.g. images acquired in a retail store of a retail unit such as a shelving unit displaying retail items.

Template Image

The term "template image" may refer to an image representing one or more products (also referred to as "retail items) or class of products displayed on one or more store shelves. The template image may be acquired in standard conditions, i.e., the acquisition parameters (e.g., lighting, resolution, etc.) being set to predetermined values. The template images may be used for building a recognition process, which enables distinguishing a given item among a set of predetermined items. In order to do so, the template images are preferably high resolution images, for example, about 4 megapixels, about 6 megapixels, about 8 megapixels, or more. Furthermore, template images can be composed of a plurality of lower resolution template images. In certain embodiments, a template image exclusively represents the object, i.e., no other objects are contained in the template image. In certain embodiments, a ratio between an actual size of the object and a pixel size of the imaged object is associated to the template image. In other words, the template image may also be characterized by a level of magnification. This may enable linking a size of a patch, extracted from a template image, with an absolute size.

Visual Identifier

The term "visual identifier" may refer to any feature that identifies a retail item (or a product) for any purposes. Examples of visual identifiers may include: color, texture, numbering, lettering, symbols, labeling, shape, size, font, style, outlining, and the like. In one embodiment, the visual identifier may include a code that represents a product ID, such as, a barcode, a QR-code, or plurality of predefined graphical symbols (not letters or numbers) having distinct visual characteristics. In another embodiment, the visual identifier may be a combination of features representable in computer code that the system may have identified during a deep-learning process. In another embodiment, the visual identifier may include the product name. The product name may include a graphic, a figure, a script, a word, an icon or a portion of any of the forgoing displayed on or in proximity to the retail item. In yet another embodiment, the visual identifier may include the visual signature of the retail item. The visual signature may refer to a series of one or more patches distinguishing a template image of a given item from a set of template images associated with a predetermined set of items. The visual signature (also referred to as "item signature") of a given retail item may be built from the template image associated with the given retail item, taking into account the template images associated with the other retail items in the set of related items. A visual signature may comprise one or more patches hierarchically ordered with a spatial model. A visual signature may comprise a series of detectors, wherein each detector enables to detect a corresponding patch of the series of patches and the spatial model. The spatial model may define a relative positioning of at least some of the patches (and preferably each patch). For a given patch, the relative positioning may be expressed either with respect to a higher level patch or with respect to the primary patch. At least some of the patches (and preferably each patch) of the visual signature may also be associated with a property or discriminative condition. The visual signature forms a part model of an item which enables distinguishing the item from a set of related items (e.g., items belonging to the same class). The visual signature of an object is built while taking into account the other items of the set of related items. One example of a visual signature is described in greater details in Israeli patent application IL229806 assigned to the Applicant of the present application, the entire content of which is hereby incorporated by reference.

One embodiment of the present disclosure provides a method of image processing comprising: obtaining by an imaging device a low resolution version and a high resolution version of a retail image, the high resolution version of the retail image being a temporary file to be erased automatically after a predetermined time period; transmitting to a server the low resolution version of the retail image; upon receipt of a request from the server, the request including data representative of a contour of an unidentified item in the low resolution version of the retail image, cropping a high resolution item image from the high resolution version of the retail image, the high resolution item image corresponding to the contour of the unidentified item; and transmitting the high resolution item image to the server thereby enabling updating an item database.

In some embodiments, the data representative of the contour comprise a position and size of the unidentified item in the low resolution version of the retail image and/or in the high resolution version of the retail image. In some embodiments, the high resolution version of the retail image is an image as captured by the imaging device or a compressed version of said image. In some embodiments, the method further comprises erasing the high resolution version of the retail image from the imaging device after the high resolution item image has been transmitted. In some embodiments, when the request from the server is received by the imaging device after the predetermined time period, the method further comprising displaying to the user an invitation to acquire another image of the unidentified item.

In some embodiments, the solution is based on the data representative of the contour of the unidentified item in the low resolution version of the retail image. In some embodiments, the server comprises an item database associating identified items with a visual identifier distinguishing said identified items, the method further comprising searching of the visual signatures by the server in the low resolution version of the retail image. In some embodiments, the unidentified item in the low resolution version of the retail image does not correspond to any of the identified items in the item database. In some embodiments, the method further comprises searching of the visual identifiers by the server in the high resolution item image so as to check that the unidentified item cannot be recognized. In some embodiments, the method further comprises: cropping by the server of the low resolution version of the retail image to form a basic item image around a contour of the unidentified item; storing the basic item image in the item database; and updating the visual identifiers of the identified items using said basic item image. In some embodiments, the basic item image is replaced by the high resolution item image in the item database after the high resolution item image is transmitted by the imaging device. In some embodiments, the unidentified item is detected by searching the server for a high level identifier within the low resolution version of the retail image and further comprising associating the unidentified item with said high level identifier in the item database if said high level identifier is recognized in the low resolution retail image. In some embodiments, the high level identifier is selected among a set of high level identifiers configured to distinguish a set of expected trademarks.

In another aspect, the present disclosure provides a handheld imaging device comprising: memory; an image sensor; a display communicatively coupled to the memory; and a processing unit communicatively coupled to the memory, display and image sensor, wherein the memory includes instructions for causing the processing unit to perform an image processing method comprising: obtaining a low resolution version and a high resolution version of a retail image, the high resolution version of the retail image being a temporary file to be erased automatically after a predetermined time period; transmitting to a server the low resolution version of the retail image; upon receipt of a request from the server, the request including data representative of a contour of an unidentified item in the low resolution version of the retail image, cropping a high resolution item image from the high resolution version of the retail image, the high resolution item image corresponding to the contour of the unidentified item; and transmitting the high resolution item image to the server thereby enabling updating an item database.

In another aspect, the present disclosure provides a computer program product implemented on a non-transitory computer usable medium having computer readable program code embodied therein to cause the computer to perform an image processing method comprising: forming a low resolution version and a high resolution version of a retail image, the high resolution version of the retail image being a temporary file to be erased automatically after a predetermined time period; transmitting to a server the low resolution version of the retail image; upon receipt of a request from the server, the request including data representative of a contour of an unidentified item in the low resolution version of the retail image, cropping a high resolution item image from the high resolution version of the retail image, the high resolution item image corresponding to the contour of the unidentified item; transmitting the high resolution item image to the server thereby enabling updating an item database. In another aspect, the present disclosure provides an image processing system comprising an imaging device and a server configured for performing the method previously described.

In another aspect, the present disclosure provides a data processing apparatus comprising: a receiver module configured for receiving a low resolution version of a retail image from an imaging device; an item database configured for storing a set of visual identifiers associated with a set of predetermined identified items; a recognition module configured for: searching the visual identifiers in the low resolution version of the retail image to recognize the identified items in the low resolution image; and detecting an unidentified item in the low resolution version of the retail image; a transmitter module configured for sending a request to the imaging device, the request including data representative of a contour of the unidentified item in the low resolution version of the retail image; wherein the receiver module is further configured for receiving from the imaging device, in response to the request, a high resolution item image derived from a high resolution temporary version of the retail image stored in the imaging device, said high resolution item image enabling updating the item database.

In some embodiments, the data processing apparatus further comprises a classifying module configured for updating the visual signatures (or visual identifiers) using template images of the identified items and the high resolution item image. In some embodiments, an unidentified item is detected by partially recognizing a stored visual signature (or a stored visual identifier). In some embodiments, the recognition module is further configured for searching the visual signatures (or visual identifiers) in the received high resolution item image so as to check that the unidentified item cannot be recognized.

Figure 1:
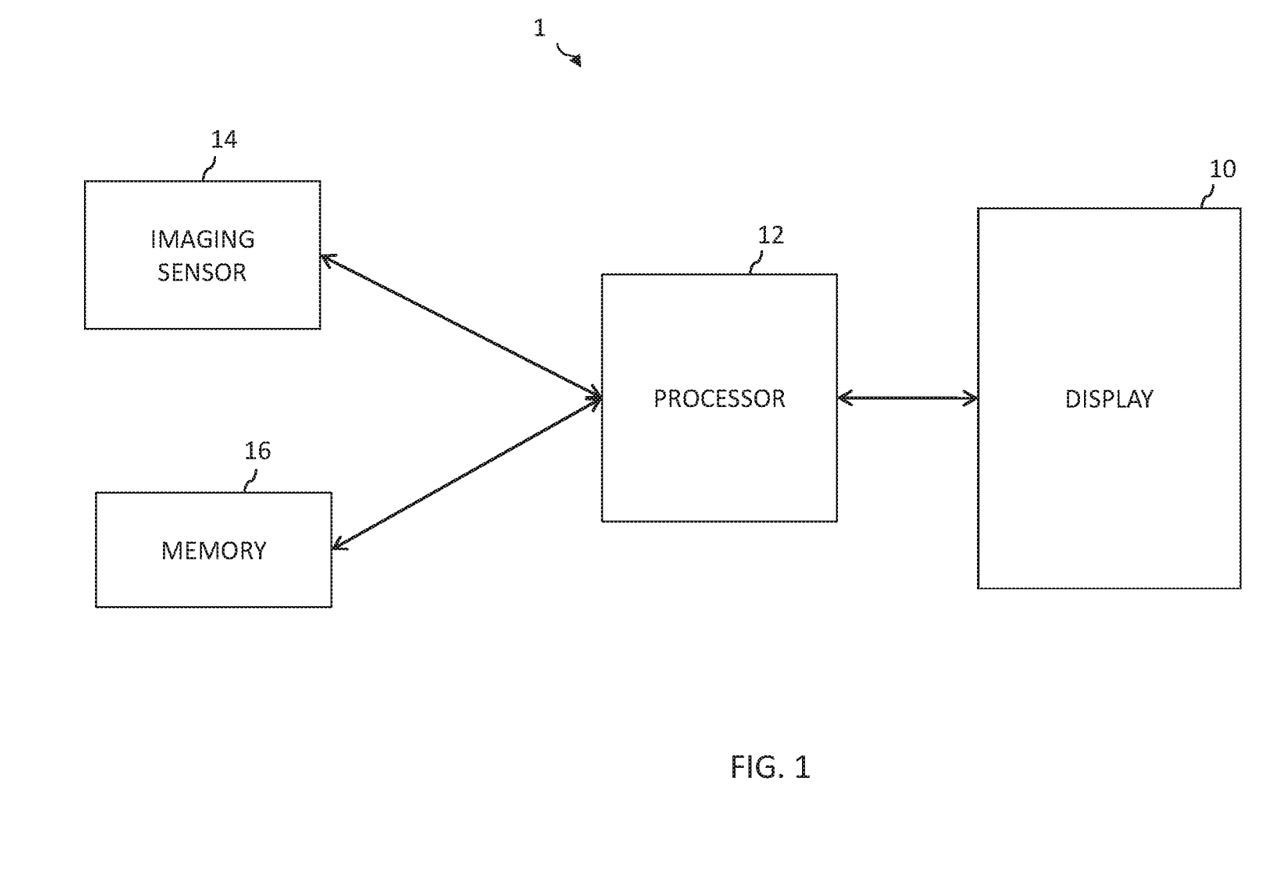
FIG. 1 illustrates schematically an imaging device according to embodiments of the present disclosure.

FIG. 1 illustrates a simplified functional block diagram of an imaging device 1 according to embodiments of the present disclosure. The device 1 may be a handheld electronic device and may include a display 10, a processor 12, an imaging sensor 14 and memory 16. The processor 12 may be any suitable programmable control device and may control the operation of many functions, such as the generation and/or processing of an image, as well as other functions performed by the electronic device. The processor 12 may drive the display (display screen) 10 and may receive user inputs from a user interface. The display screen 10 may be a touch screen capable of receiving user inputs. The memory 16 may store software for implementing various functions of the electronic device including software for implementing the image processing method according to the present disclosure. The memory 16 may also store media such as images and video files. The memory 16 may include one or more storage mediums tangibly recording image data and program instructions, including for example a harddrive, permanent memory and semi-permanent memory or cache memory. Program instructions may comprise a software implementation encoded in any desired language. The imaging sensor 14 may be a camera with a predetermined field of view. The camera may either be used in video mode, in which a stream of images is acquired upon command of the user, or in photographic mode, in which a single image is acquired upon command of the user.

Figure 2:
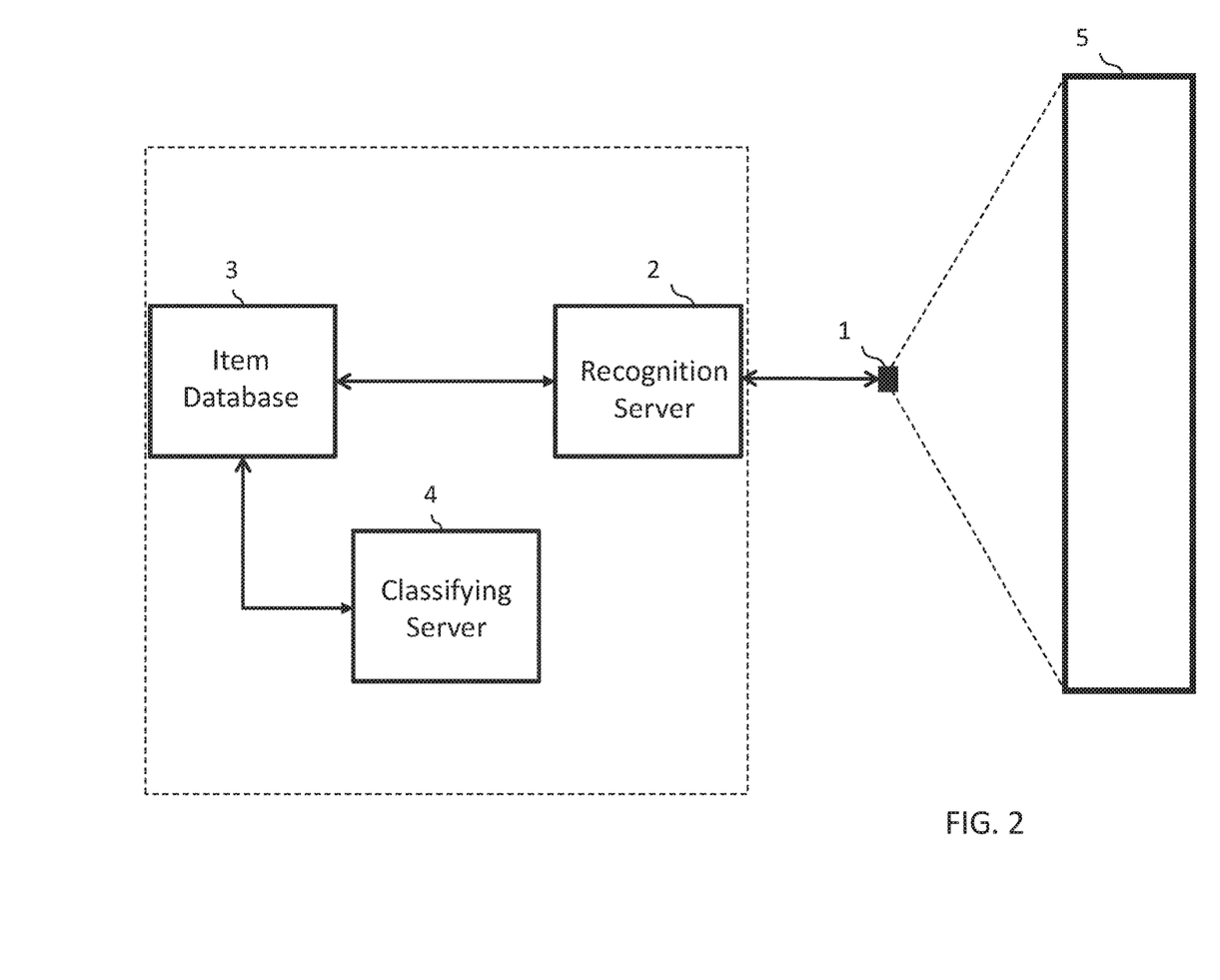
FIG. 2 illustrates functional elements collaborating according to embodiments of the present disclosure.

FIG. 2 illustrates generally a high level functional diagram of elements capable of implementing embodiments of the method described in the present disclosure. More particularly, FIG. 2 shows at least one imaging device 1 imaging a retail unit 5 and communicating with a recognition server 2. The at least one imaging device 1 may include a single imaging device 1 or multiple imaging devices 1. The retail unit 5 may be configured to display retail items. The retail unit 5 may be, for example, a store shelf or a shelving unit and the retail items may be any kind of products, for example bottles, cans, boxes, etc. Preferably, the retail items may be rigid objects. The at least one imaging device 1 may be configured to create a low resolution version and a high resolution version of the retail image. The retail image may be representative of a flank of the shelving unit and may contain images of one or more of the retail items. In one example, the retail image may include a plurality of products displayed on a store shelf. The low resolution version and the high resolution version of the retail image may result from compressing an image acquired by the at least one imaging device 1. For example, the compression type may be a JPEG compression. The high resolution version of the retail image may be configured to be a temporary file which is erased automatically after a predetermined time period has elapsed from the creation of said high resolution version. Typically, the predetermined time period may be of less than an hour, for example between 1 and 10 minutes, or between 1 and 3 minutes, or in another example, 5 minutes.

In one embodiment, the at least one imaging device 1 may be configured to communicate with the recognition server 2. The at least one imaging device 1 may be configured to transmit the low resolution version of the retail image to the recognition server 2 using a communication data link, for example a wireless communication data link such as a 3G or a Wi-Fi connection. The at least one imaging device 1 may further be configured to transmit at least a part of the high resolution version of the retail image to the recognition server 2 (and/or to a classifying server 4 as described below) if, before the predetermined time period has elapsed, a request about at least one product from the recognition server 2 is received by the at least one imaging device 1. In addition to the at least a part of the high resolution version of the retail image, the at least one imaging device 1 may provide additional information about the at least one product.

In one embodiment, the request may ask the at least one imaging device 1 to transmit an additional image of the at least one product. For example, the request may include data representative of a contour of an unidentified item in the low resolution version of the retail image. Specifically, recognition server 2 and/or classifying server 4 may determine a region of interest in the image, and to transmit a request related to the determined region of interest. For example, recognition server 2 and/or classifying server 4 may highlight the region of interest in the low resolution version of the retail image received from the at least one imaging device, and to send the modified low resolution version retail image back to imaging device 1 along with the request. In this example, the at least one imaging device 1 may be configured for cropping the high resolution version of the retail image according to said data in order to restrict the transmission to a region of interest in the high resolution version of the retail image, said region of interest corresponding to the unidentified item area (item area) within said high resolution version of the retail image. The cropping of the high resolution version of the retail image may thereby provide a high resolution item image (or high resolution clip). In one instance, the region of interest may include a plurality of representations of similar products, and the request may ask a user operating the imaging device 1 to identify if the similar products are of a same type.

In another embodiment, recognition server 2 and/or classifying server 4 may send imaging device 1 a request that asks a user operating the at least one imaging device 1 to provide additional information regarding the least one product. For example, the additional information may include at least one detail characterizing the least one product (e.g., a product brand name, a product size, a product fat percentage, an indication if the product is gluten free, an indication if the product is Kosher, and more). In addition, the at least one detail characterizing the least one product may include a detail that is not visually shown on the least one product and may be associated with the business selling the least one product. For example, the at least one detail characterizing the least one product may include the price of the least one product or a promotion associated with the least one product.

The recognition server 2 may be configured to have access to an item database 3, which may store a set of visual identifiers corresponding to a plurality of retail items. In one example, the item database 3 may store visual signatures (or visual identifiers) of a set of predetermined items. In another example, the item database 3 may also store a set of high level identifiers configured to distinguish expected trademarks (brands, logos, labels, designs, etc.). This further enables the recognition server 2 to recognize said expected trademarks on retail items that do not belong to the plurality of retail items associated with the visual identifiers. The visual identifiers may be used to form a classifier of the predetermined items and may be created based on a set of template images associated with the set of items. The recognition server 2 may be capable of accessing the item database 3 for using the visual identifiers so as to run a recognition process on the transmitted low resolution version of the retail image. The item database 3 may store the visual identifiers associated with the plurality of retail items and may also store the template images associated with said items. In some embodiments, a low resolution template image (or a basic item image, as explained in more details below) may be stored and the item database may include a low resolution visual signature (or a visual identifier) defined based on said low resolution template image.

It is noted that the item database 3 and the recognition server 2 may in certain embodiments be implemented on a single hardware or by a single software module. A classifying server 4 may carry out a method of defining one or more visual signatures (or visual identifiers) associated with one or more products belonging to the predetermined set of products (a classifier). The classifying server 4 and the recognition server 2 may also be implemented on a single hardware or by a single software module. The recognition server 2 may carry out a method of object recognition on the images acquired by the at least one imaging device 1 based on the visual identifiers defined by the classifying server 4 and stored on the item database 3. The recognition server 2 may therefore be configured to retrieve the defined visual identifiers from the item database 3, as illustrated by the arrow showing communication between the recognition server 2 and the item database 3. The recognition server 2 may further be configured to receive at least one image derived from the at least one imaging device 1, as illustrated by the arrow showing communication between the recognition server 2 and the at least one imaging device 1.

The recognition server 2 may be configured to recognize any number of retail items related to the pre-defined visual identifiers found on the transmitted low resolution version of the retail image. Moreover, any number of instances of the same retail item could be detected in said version. The recognition server 2 may basically search if any of the one or more visual identifiers can be detected in the captured image. In some embodiments, the recognition process may be executed in parallel using several computational units. In some embodiments, the recognition server 2 may attempt to recognize at least one of the retail items to a degree of certainty by searching for a visual identifier in retail image. The desired degree of certainty may be predetermined and incorporated in the image recognition process. In some cases, the degree of certainty may be determined using statistical or experimental methods such as machine learning. When the attempt at least partially fails, the recognition server 2 may send to the at least one imaging device 1 a request to provide additional information about the at least one product.

As explained in more detail below with reference to FIG. 3, the present disclosure notably proposes a way of updating and enriching the item database 3 when an unidentified item is detected in an image. Generally, the present disclosure suggest a method to update item database 3 when an attempt to recognize at least one of the plurality of products to a degree of certainty at least partially fails. In most cases, a low resolution version of a retail image is sufficient for identifying accurately the plurality of products contained in said image using the recognition process based on the visual identifiers (such as visual signatures) in the image. However, in some cases the recognition process is improved when performed on high resolution images. Therefore, the present disclosure proposes an automatic method, which enables updating the visual identifiers of the item database 3 while limiting the amount of data to be communicated by and stored on the at least one imaging device 1. It is understood that since the visual identifiers enable distinguishing a retail item among a set of predetermined retail items, enriching the set of predetermined retail items with one or more additional retail items may modify the definition of the visual signature and therefore require the visual identifier to be updated taking into account said additional retail item.

Figure 3:
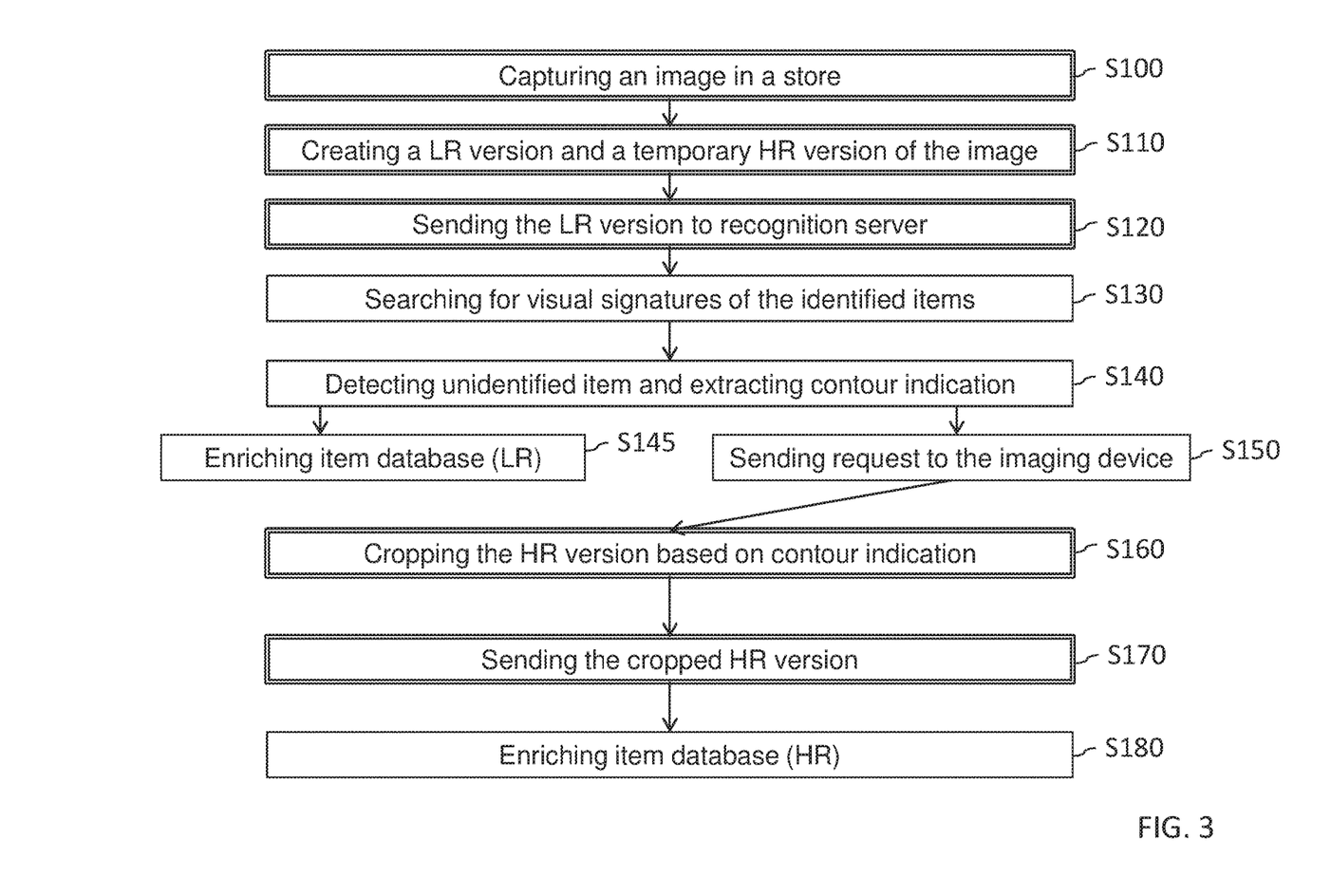
FIG. 3 illustrates steps of an image processing method according to embodiments of the present disclosure.

FIG. 3 is a flow chart illustrating steps of a method according to embodiments of the present disclosure. The method described below may be implemented by at least one imaging device collaborating with at least one remote server as previously described to identify at least one product. The at least one server may include a recognition server, a classifying server, and an item database. The recognition server may perform an online (real-time) recognition process and the classifying server may perform an offline classifying process. In FIG. 3, steps that may be performed on the at least one server side are represented by simple blocks while steps that may be performed at the at least one imaging device side are represented by blocks surrounded by a double border.

In step S100, at least one retail image of a plurality of products displayed on a store shelf may be captured using a first imaging device. For example, the retail image may be acquired in a store, in front of a shelving unit displaying retail items such as soda bottles. The present disclosure distinguishes between a first imaging device that captures and transmits the low resolution version of the retail image, and a second imaging device that responds to the request from the at least one server. In some embodiments, the first imaging device and the second imaging device may be the same device. In other embodiments, the first imaging device and the second imaging device are separated devices associated with different users.

In step S110, a low resolution version and a high resolution version of the retail image may be created by the first imaging device. The high resolution version of the retail image may be created as a temporary image which may be erased automatically after a predetermined time period has elapsed from its creation. In some embodiments, the low resolution version may be no more than 500 kb, no more than 1 megapixels, or no more than 2 Mb. In some embodiments, the high resolution version may be no less than 2 Mb, no less than 4 Mb, no less than 8 Mb. In some embodiments, the high resolution version may in fact be the retail image as acquired by the first imaging device and an automatic deletion by the first imaging device may be programmed.

In a further step S120, the low resolution version of the retail image may be transmitted to the recognition server. The low resolution version of the retail image may include at least one image of a plurality of products displayed on a store shelf. From the server side, step S120 may include receiving from the first remote imaging device at least one image of a plurality of products displayed on a store shelf, for example, the low resolution version of the retail image.

In a further step S130, the at least one server may carry out a recognition process on the low resolution version of the retail image. The at least one server may search if any of the one or more visual identifiers stored on the item database can be detected in the received at least one image. In other words, the at least one server attempts to recognize at least one of the plurality of products to a degree of certainty by searching for a visual identifier in the at least one image. There are several options for the at least one server to search for visual identifiers in the at least one image. In some embodiments, when the visual identifiers may be visual signatures, for each visual signature, the at least one server may search sequentially in the whole image for each patch of the visual signature. Thereafter, identification of a visual signature in the at least one image may be decided based on the relative position of the detected patches by comparing with the relative positions of the inferior level patches in said visual signature. In some embodiments, for each visual signature, the at least one server may be configured to search, in the whole image, only the primary patch. Using the detector associated with said primary patch, one may derive scale and orientation indications to each candidate of product. Thereafter, for the subsequent patches, given these indications and the relative position indication associated with subsequent patches from the visual signature, the at least one server may be configured to search for inferior level patches in restricted regions of interest (ROI) of the low resolution version of the retail image. In one embodiment, step S130 is executed by recognition server 2.

In step S140, an unidentified item may be detected. The unidentified item may include some recognizable features but may not exactly match any of the visual identifiers stored on the item database. In other words, the attempt to recognize at least one of the plurality of products at least partially fails. In some embodiments, the unidentified item may be detected by detecting a high level identifier and by the unidentified item not fully matching any of the stored visual identifiers. In other embodiments, when the visual identifiers may be visual signatures, an unidentified item may be detected by a partial recognition of one or more patches of a visual signature. In one embodiment, high level identifiers may be additionally searched in the low resolution version of the retail image. The high level identifiers may be stored in the item database and may enable to recognize expected trademarks. This may enable to associate the unidentified item with a known trademark (high level identifier). Furthermore, a contour of the unidentified item may be roughly determined using a size and optionally an orientation of said one or more detected patches or high level identifier. In some embodiments, an unidentified item may be detected manually by a user reviewing the low resolution version of the retail image. A low resolution item image may also be gathered for training the recognition process.

As shown in step S145, the item database may be updated and enriched at this stage. A basic item image may be defined based on the contour of the unidentified item in the low resolution version of the retail image. The basic item image may include a cropping of the low resolution version of the retail image including the unidentified item. For example, the contour indication may comprise a position and size information about the unidentified item in the low resolution version of the retail image. In some embodiments, the basic item image may be processed by the at least one server in order to define a visual identifier corresponding to the unidentified retail item and/or the already existing visual identifiers corresponding to the predetermined set of retail items may be updated using said low resolution (basic) item image. However, as explained above, the basic item image may not be sufficient to recognize all the plurality of products and additional information may be required. In one example, a quality of the visual signature may be improved by retrieving an additional higher resolution image of the unidentified item. In another example, the additional information may include one or more details characterizing the least one product.

Therefore, in step S150, a request may be transmitted to a second imaging device by the at least one server. In one embodiment, the request may ask the second remote imaging device to transmit an additional image of the at least one product. For example, the request may cause the second imaging device to transmit back to the at least one server at least part of the high resolution version of the retail image, if the request is received before the predetermined time period expires. The request may include data indicative of the contour of the unidentified item in the low resolution version of the retail image. Alternatively, when the request is sent after the predetermined time period has elapsed, an invitation may be displayed on the second imaging device for inviting the user to acquire an additional image of the unidentified item. In one example, the additional image of the unidentified item may have an image resolution higher than the at least one image received from the first imaging device. In another example, the additional image of the unidentified item may be captured from a different capturing angle than the capturing angle of the at least one image captured by the first imaging device. In another example, the additional image of the unidentified item may be captured by a different imaging device than the first imaging device. In another example, the additional image of the unidentified item may be captured at a different time than the at least one image captured by the first imaging device. In yet another example the additional image of the unidentified item may include an SKU bar code (or any other code, such as, QR code) of the at least one product. The invitation included in the request may include the basic item image previously defined, based on the low resolution version of the retail image and on the contour indication received in the request. In other embodiments, the request may ask a user operating the second remote imaging device to provide additional information regarding the unidentified item. For example, the additional information may include at least one detail characterizing the unidentified item (e.g., the item brand name, the item size, the item fat percentage, an indication if the item is gluten free, an indication if the item is Kosher, and other characterizations). In addition, the at least one detail characterizing the unidentified item may include a detail that is not visually shown on the unidentified item. The detail may be associated with the business selling the unidentified item. For example, the at least one detail characterizing the unidentified item may be the price of the unidentified item or a promotion associated with unidentified item.

In step S160, upon receipt of the request from the at least one server, the second remote imaging device may obtain the requested information. In one example, when the request includes data representative of a contour of the unidentified item, the requested information may include a portion of an image that corresponds with the contour of the unidentified item and with an image resolution higher than the received at least one image. Specifically, the data representative of the contour includes a position and size of the at least one product in the received at least one image. In one example, the high resolution version of the retail image may be cropped based on the transmitted contour indication so as to isolate the unidentified item area from the high resolution version of the retail image, thereby defining a high resolution item image. The item area may correspond to the contour of the unidentified item and include the unidentified item. In another example, when the requested information includes at least one detail characterizing the least one product, the user of the second imaging device may manually input data associated with the requested information.

In step S170 the at least one server may receive from the second remote imaging device a response with the obtained information. In one example, the high resolution (HR) item image may be transmitted to the at least one server (i.e., to the classifying server and/or to the recognition server). In this example, after the HR item image was transmitted to the at least one server, the high resolution version of the retail image may be deleted. In another example, the received response may include the additional information with at least one detail characterizing the unidentified item.

In step S180, the item database may be updated and enriched based on the received response. For example, the at least one server may update a visual identifier of a retail item stored in the item database based on the received response. Alternatively, the at least one server may add a new visual identifier of a new retail item to the item database based on the at least one image and the received response. For example, the new retail item may include a new SKU, a new version related to a known product, a promotion product, an existing product with a new package, an existing product in a different size, and more. In one embodiment, when the received response includes an HR item image, the HR item image may be processed by the classifying server in order to define a visual signature corresponding to the unidentified item and/or the already existing visual signatures corresponding to the predetermined set of items may be updated. Furthermore, high level identifiers may be searched in the HR item image so as to associate the HR item image with a known high level identifier (brand/trademark for example). The basic item image may be replaced by the HR item image in the item database. In some embodiments, the recognition process may be run on the HR item image to try to recognize the stored visual signatures on the HR item image. Indeed, the low resolution version of the retail image may not provide a sufficient quality for distinguishing an item belonging to the predetermined set of items while the high resolution item image may provide such a sufficient quality. In another embodiment, when the received response includes additional information with at least one detail characterizing the unidentified item, the at least one server case is configured to update the item database accordingly.

Consistent with the present disclosure, the enrichment of the item database may be optional and the method may directly enable improving the recognition rate by providing selective information to the at least one server. In that way, the at least one server may recognize retail items using new visual identifiers added to the database. Specifically, the at least one server may identify retail items based on captured images and the received response. In addition, a retail item found in an image captured by an imaging device may be identified through recognizing a visual identifier associated with retail item. Therefore, using the proposed system, the retail item may be identified without recognizing an SKU bar code on the retail item.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention. It will be appreciated that the embodiments described above are cited by way of example, and various features thereof and combinations of these features can be varied and modified. While various embodiments have been shown and described, it will be understood that there is no intent to limit the invention by such disclosure, but rather, it is intended to cover all modifications and alternate constructions falling within the scope of the invention, as defined in the appended claims.

In addition, it will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. An image processing system for analyzing retail items displayed on store shelves, the system comprising:
   a database configured to store a set of visual identifiers corresponding to a plurality of retail items;
   at least one server configured to:
   receive from a first electronic device at least one image of a plurality of products displayed on a store shelf;
   determine a region of interest in the at least one image, wherein the region of interest includes a plurality of representations of similar products;
   attempt to recognize at least one of the plurality of products to a degree of certainty by searching for a visual identifier in the region of interest of the at least one image;
   send to a second electronic device a request about the at least one product, when the attempt at least partially fails, wherein the request asks a user operating the second electronic device to identify if the similar products in the region of interest are of a same type;
   receive from the second electronic device a response; and
   identify the at least one product based on the at least one image and the received response.

2. The image processing system of claim 1, wherein the request further asks the second electronic device to transmit an additional image of the at least one product.

3. The image processing system of claim 2, wherein the additional image of the at least one product has an image resolution higher than the received at least one image.

4. The image processing system of claim 2, wherein the additional image of the at least one product is captured from a different capturing angle than the received at least one image.

5. The image processing system of claim 2, wherein the additional image of the at least one product is captured by a different electronic device than the first electronic device.

6. The image processing system of claim 2, wherein the additional image of the at least one product includes an SKU bar code for the at least one product.

7. The image processing system of claim 1, wherein the request further asks a user operating the second electronic device to provide additional information regarding the least one product.

8. The image processing system of claim 7, wherein the additional information includes at least one detail characterizing the least one product.

9. The image processing system of claim 8, wherein the at least one detail characterizing the least one product is not visually shown on the least one product.

10. The image processing system of claim 1, wherein the at least one server is configured to update a product database based on the received response.

11. The image processing system of claim 1, wherein the request includes data representative of a contour of the at least one product, and the received response includes portion of an image that corresponds with the contour of the at least one product and with an image resolution higher than the at least one image received from the first electronic device.

12. The image processing system of claim 11, wherein the data representative of the contour includes a position and size of the at least one product in the at least one image received from the first electronic device.

13. The image processing system of claim 1, wherein the at least one product is identified through recognizing the visual identifier.

14. The image processing system of claim 1, wherein the database is further configured to store a set of high level identifiers corresponding to the plurality of retail items, and the at least one product is identified through recognizing a high level identifier.

15. The image processing system of claim 1, wherein the at least one product is identified without recognizing an SKU bar code on the at least one product.

16. The image processing system of claim 1, wherein the at least one server is configured to update a visual identifier of a retail item stored in the database based on the received response.

17. The image processing system of claim 1, wherein the at least one server is configured to add a new visual identifier of a new retail item to the database based on the at least one image and the received response.

18. The image processing system of claim 17, wherein the at least one server is further configured to recognize retail items using the new visual identifier added to the database.

19. The image processing system of claim 1, wherein the at least one server is further configured to highlight the region of interest in the at least one image received from the first electronic device, and to send the highlighted at least one image to the second electronic device along with the request.

20. The image processing system of claim 1, wherein the first electronic device is at least one of a digital camera, a fixed camera with communication layers, an electronic handheld device, an autonomous robotic device, and a drone.

21. The image processing system of claim 1, wherein the first electronic device and the second electronic device are a same device.

22. A non-transitory computer readable medium for image processing, the computer readable medium including instructions that, when executed by at least one processor, cause the at least one processor to perform operations comprising:
   receiving from a first electronic device at least one image of a plurality of products displayed on a store shelf;
   determining a region of interest in the at least one image, wherein the region of interest includes a plurality of representations of similar products;
   attempting to recognize at least one of the plurality of products to a degree of certainty by searching for a visual identifier in the region of interest of the at least one image;
   sending to a second electronic device a request about the at least one product, when the attempt at least partially fails, wherein the request asks a user operating the second electronic device to identify if the similar products in the region of interest are of a same type;
   receiving from the second electronic device a response; and
   identifying the at least one product based on the at least one image and the received response.

23. An image processing system for analyzing retail items displayed on store shelves, the system comprising:
   a database configured to store a set of visual identifiers corresponding to a plurality of retail items;
   at least one server configured to:
   receive from a first electronic device at least one image of a plurality of products displayed on a store shelf;
   attempt to recognize at least one of the plurality of products to a degree of certainty by searching for a visual identifier in the at least one image;
   send to a second electronic device a request about the at least one product, when the attempt at least partially fails, wherein the request includes data representative of a contour of the at least one product;

receive from the second electronic device a response including portion of an image that corresponds with the contour of the at least one product and with an image resolution higher than the at least one image received from the first electronic device; and identify the at least one product based on the at least one image and the received response.

24. The image processing system of claim 23, wherein the data representative of the contour includes a position and size of the at least one product in the at least one image received from the first electronic device.

\* \* \* \* \*